United States Patent
Bahai

(10) Patent No.: US 7,509,595 B1
(45) Date of Patent: *Mar. 24, 2009

(54) METHOD AND SYSTEM FOR ENABLING ENERGY EFFICIENT WIRELESS CONNECTIVITY

(75) Inventor: Ahmad Bahai, Lafayette, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 443 days.

This patent is subject to a terminal disclaimer.

(21) Appl. No.: 11/361,501

(22) Filed: Feb. 24, 2006

Related U.S. Application Data

(63) Continuation of application No. 10/453,475, filed on Jun. 2, 2003, now Pat. No. 7,017,127.

(51) Int. Cl.
    *G06F 17/50* (2006.01)
(52) U.S. Cl. ............................ 716/1; 716/2; 716/7
(58) Field of Classification Search ............... 716/1–2, 716/5, 7–8, 10, 18; 710/8; 372/222, 345; 370/335, 342; 455/456, 466, 517, 560
    See application file for complete search history.

(56) References Cited

U.S. PATENT DOCUMENTS

| | | | |
|---|---|---|---|
| 4,439,839 A | 3/1984 | Kneib et al. | |
| 4,641,238 A | 2/1987 | Kneib | |
| 4,837,678 A | 6/1989 | Culler et al. | |
| 5,056,000 A | 10/1991 | Chang | |
| 5,237,673 A | 8/1993 | Orbits et al. | |
| 5,479,453 A | 12/1995 | Anvari et al. | |
| 5,577,250 A | 11/1996 | Anderson et al. | |
| 5,623,684 A | 4/1997 | El-Ghoroury et al. | |
| 5,692,207 A | 11/1997 | Ho-Lung et al. | |
| 5,854,904 A | 12/1998 | Brown | |
| 5,867,400 A | 2/1999 | El-Ghoroury et al. | |
| 5,878,036 A * | 3/1999 | Spartz et al. | 370/335 |
| 5,901,301 A | 5/1999 | Matsuo et al. | |
| 6,067,295 A | 5/2000 | Bahai et al. | |
| 6,097,770 A | 8/2000 | Bahai et al. | |
| 6,275,525 B1 | 8/2001 | Bahai et al. | |
| 6,446,193 B1 | 9/2002 | Alidina et al. | |
| 6,453,407 B1 | 9/2002 | Lavi et al. | |
| 6,526,543 B1 * | 2/2003 | Rosser | 716/2 |
| 6,892,373 B2 | 5/2005 | Whitaker et al. | 716/1 |
| 2002/0133786 A1 | 9/2002 | Weis | 716/1 |

(Continued)

OTHER PUBLICATIONS

U.S. Appl. No. 10/453,896, Non-Final Rejection, Apr. 12, 2007.

(Continued)

*Primary Examiner*—Paul Dinh
(74) *Attorney, Agent, or Firm*—Darby & Darby P.C.; John Tolomei

(57) ABSTRACT

An apparatus and method that enables several different factors associated with the implementation of a particular wireless application to be considered in the design of an energy efficient wireless connectivity solution for an integrated circuit. Factors regarding the implementation of wireless communication, such as spectral efficiency, number of transistors available in an integrated circuit to process the signal, travel distance to be covered by the wireless signal and application processing of data included in the wireless signal are considered when designing the arrangement and subsequent generation of analog and digital circuits for a particular wireless application.

23 Claims, 6 Drawing Sheets

U.S. PATENT DOCUMENTS

| | | | |
|---|---|---|---|
| 2003/0093763 A1 | 5/2003 | McConaghy | 716/2 |
| 2004/0128641 A1 | 7/2004 | Broberg et al. | 716/18 |
| 2008/0022233 A1* | 1/2008 | Douriet | 716/1 |

OTHER PUBLICATIONS

Qualcomm Incorporated CDMA Technologies, MSM5100 Mobile State Modem device specification, 4 pages, 2001.

Qualcomm Incorporated CDMA Technologies, MSM3000 Mobile State Modem device specification, 2 pages, 2001.

Qualcomm Incorporated CDMA Technologies, MSM3100 Device Specification, Advance Information, 93-V0104-1 X4, 444 pages, Sep. 24, 1999.

Ma et al., U.S Appl. No. 09/348,783, filed Jul. 7, 1999 (copy not attached).

Khoo et al., U.S. Appl. No. 09/458,131, filed Dec. 9, 1999 (copy not attached).

Hennessy and Patterson, Computer Srchitecture—A Quantitative Approach, 2nd Edition, 1996, pp. 87-88.

Stiller et al., "A Flexible Middleware for Multimedia Communication: Design, Implementation, and Experience:," IEEE JSAC Special Issue on Middleware, vol. 17, No. 9, pp. 1614-1631, 1999.

* cited by examiner

METHOD AND SYSTEM FOR ENABLING ENERGY EFFICIENT WIRELESS CONNECTIVITY

CROSS-REFERENCE TO RELATED APPLICATIONS

This Application is a continuation of U.S. patent application Ser. No. 10/453,475 filed on Jun. 2, 2003, now U.S. Pat. No. 7,017,127 B1 issued on Mar. 21, 2006, which is incorporated by reference herein.

BACKGROUND OF THE INVENTION

Recently, integrated circuits, such as System on a Chip (SoC) solutions, have included connectivity for wireless connectivity, e.g., Bluetooth, IEEE 802.11a/b/g, wireless telephony, and the like. Although a relatively small percentage of the available transistors in these integrated circuits are used to provide wireless communication, those transistors employed in analog circuits that wirelessly communicate the signals consume a significantly larger percentage of the power than the transistors employed in digital circuits. In the past, the configuration of the analog and digital circuits to implement wireless connectivity has been primarily determined by a particular wireless communication standard regardless of the intended use and/or application.

Other factors regarding the implementation of wireless communication for an intended use, such as spectral efficiency, number of transistors available in an integrated circuit to process the signal, actual travel distance to be covered by the signal and application processing of data included in the signal were often secondary considerations. However, since these factors often have a significant impact on the amount of energy that is consumed in an integrated circuit, it would be desirable to consider their inter-relation when designing energy efficient wireless connectivity for an integrated circuit.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENT

Figure 1:
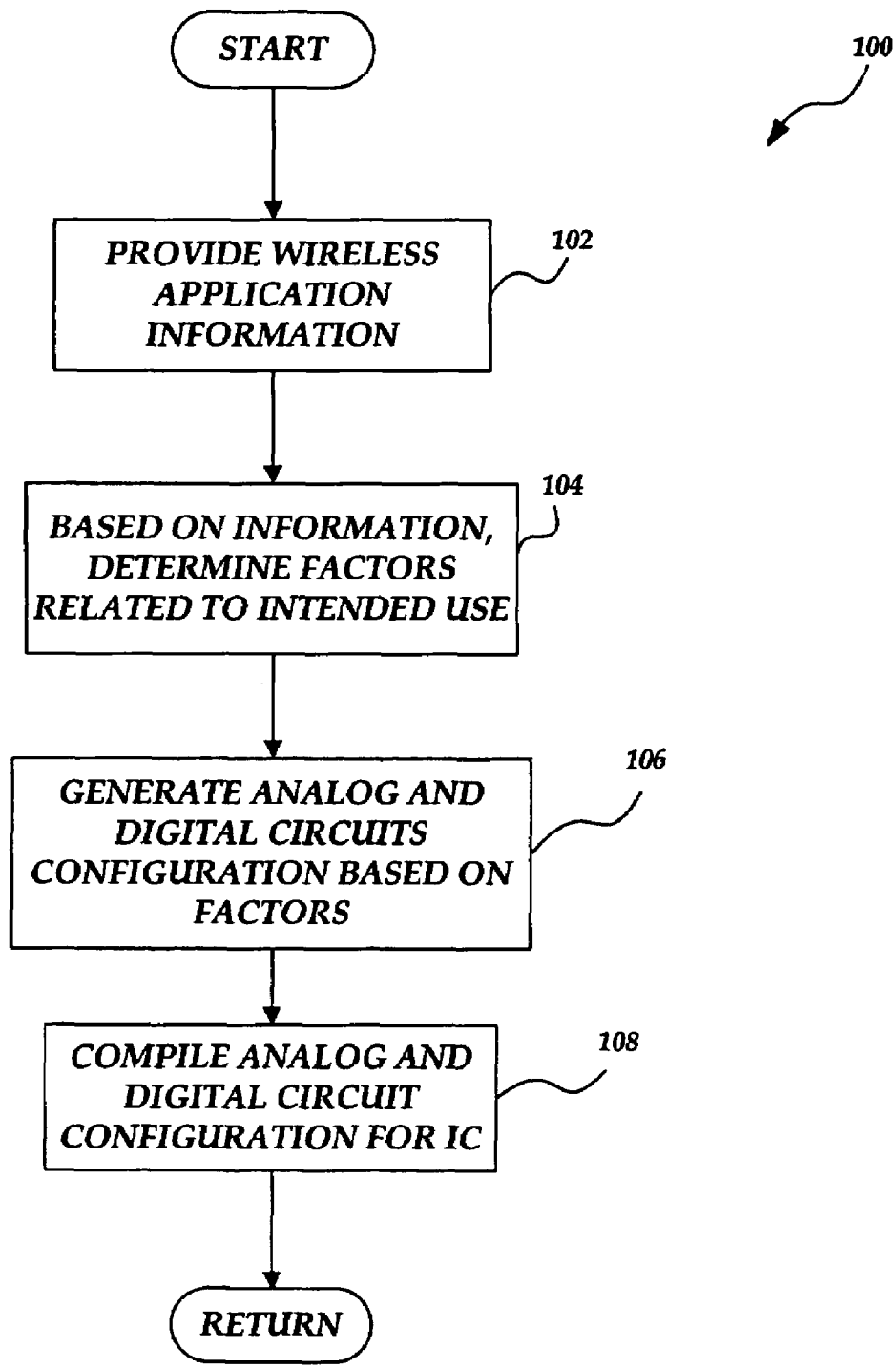
FIG. 1 illustrates a flow chart that shows an overview of a method for generating an energy efficient configuration for an integrated circuit based on an intended use.

The present invention now will be described more fully hereinafter "with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification, the term "connected" means a direct connection between the things that are connected, without any intermediary devices or components. The term "coupled," means a direct connection between the things that are connected, or an indirect connection through one or more either passive or active intermediary devices or components. The meaning of "a," "an," and "the" include plural references. The meaning of "in" includes "in" and "on."

Briefly stated, the present invention is directed to a system and method that enables several different factors associated with the implementation of a particular wireless application to be considered in the design of an energy efficient wireless connectivity solution for an integrated circuit (IC). One of these factors is related to the notion that the number of transistors that can be employed to digitally process at least some of the wireless signal doubles every 18 months. Since digital components consume substantially less energy than analog components in a wireless connectivity solution, the invention determines those aspects of a wireless communication that can be processed with more energy efficient digital components instead of analog components.

Another factor considered by the invention is related to the observation that the number of bits that can be wirelessly communicated over the same spectrum continues to double approximately every two and one half years. The invention determines those digital circuits that can provide the processing to enable this spectrum efficiency without a corresponding increase in energy consumption. In this way, substantially more data can be communicated wirelessly in the same period of time and the integrated circuit does not consume additional power.

Yet another factor considered by the invention is the actual travel distances that the data associated with the wireless application must communicate over. A wireless application such as Bluetooth, and the like, communicate over a substantially shorter distance (10 meters) than a mobile telephony application such as GSM, TDMA, CDMA, WCDMA, CDMA 2000, and the like. The invention employs the actual travel distance for data for a particular wireless application to determine a configuration of analog and digital components that can efficiently provide sufficient power for the actual travel distance. For example, if a Bluetooth enabled wireless application had an intended use where the travel distance was two meters, the invention would design analog circuits to wireless communicate the signal over the intended travel distance instead of the "standard" Bluetooth distance of 10 meters. In this way, energy consumption could be decreased while still enabling the wireless application to operate effectively for the intended use.

Another one of the factors that is considered by the invention is the observation that ever more intelligent processing of data, such as compression/decompression methods, are increasing the amount of information that can be communicated over the same period of time. The invention determines those portions of the intelligent processing that can be implemented with digital circuits, so that substantially more data can be communicated over the same period of time and the overall power consumption of a wireless connectivity solution can be decreased.

Although several factors are listed above, this listing is by no means intended to be exhaustive. Rather, it is understood that the invention determines the most energy efficient configuration of analog and digital circuits to provide a wireless connectivity solution in view of a wide variety of factors that are related to the intended use.

FIG. 1 illustrates an exemplary over view 100 of a method for creating an energy efficient wireless communication solution for an integrated circuit based on different factors. Moving from a start block, the process advances to block 102 where information regarding the intended use of a wireless application is provided. For example, this information might include the intended travel distance of data communicated wirelessly, the types of intelligent processing that will be performed on the data, the elements of the spectrum that will be used to communicate, and features of the IC that will be used.

At block 104, based on the provided information, the process determines factors that are related to the intended use and which can be configured in digital circuits to reduce energy consumption. These factors can include, but are not limited to, number of transistors in the intended IC, travel distance for data, intelligent processing of data, spectrum efficiency, and the like.

Moving to block 106, the process generates a configuration of analog and digital circuits to support the determined factors and which consume relatively low energy. For example, based on the number of available transistors in the IC, various digital circuits can be configured to handle intelligent processing of data, enable processing of the spectrum to efficient communicate data, configure an energy efficient number of analog components to wirelessly communicate the data over the intended travel distance, and the like.

At block 108, the process compiles the configuration of the analog and digital circuits for the manufacturing process of the IC. Next, the process returns to other actions.

Figure 2:
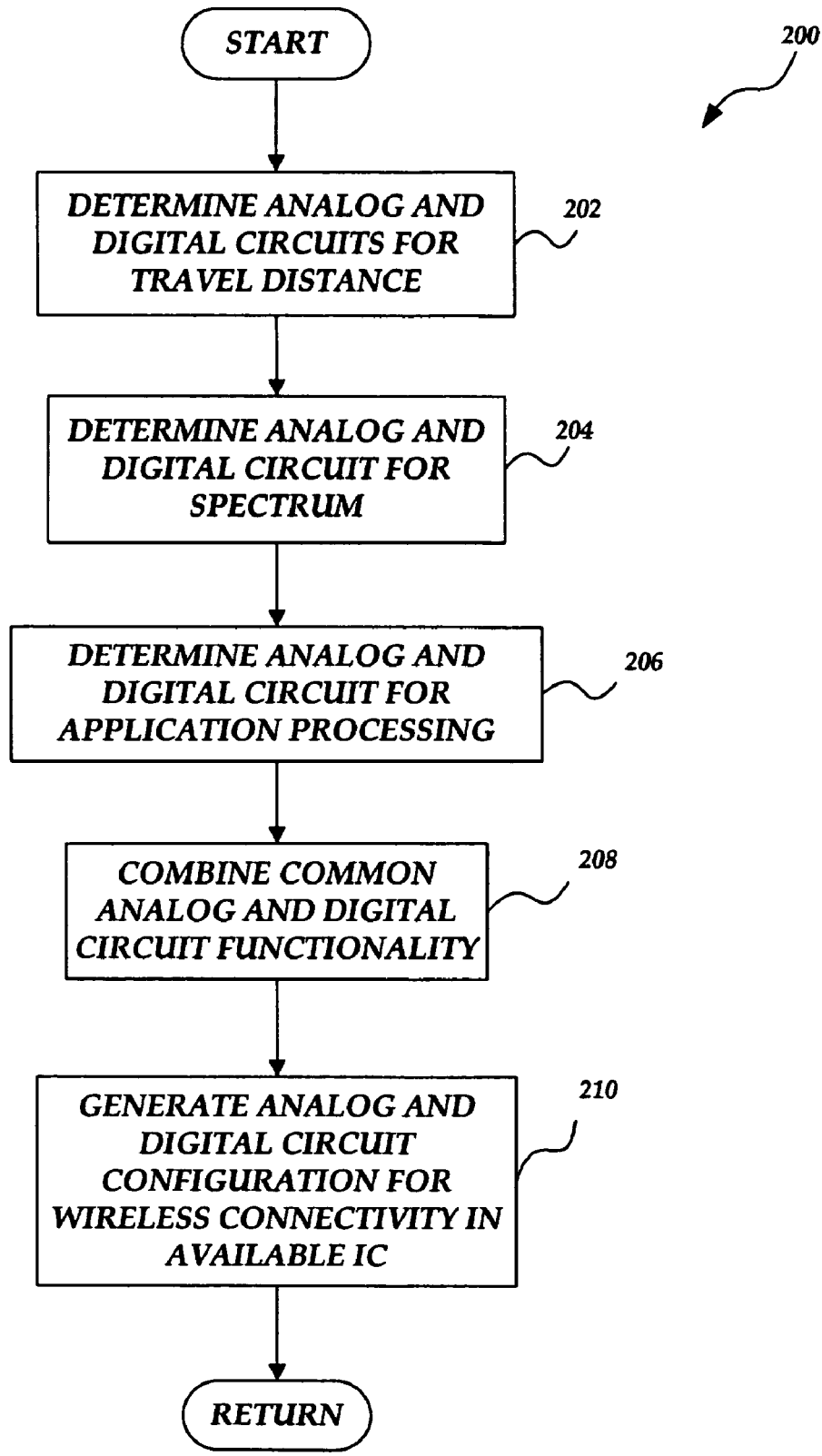
FIG. 2 shows a flow chart that illustrates an overview of a method for determining different factors related to an energy efficient configuration of an integrated circuit.

FIG. 2 illustrates an overview 200 of an exemplary method for generating energy efficient analog and digital circuits based on factors and information regarding the intended use of wireless connectivity provided for an IC. Often the energy efficiency is obtained by employing digital circuits to perform a greater percentage of the processing of the wireless signal instead of analog circuits. Advancing from block 202, the process flows to block 202 where an energy efficient configuration of analog and digital circuits is determined based on the intended range (travel distance) of data communicated wirelessly by the IC.

At block 204, an energy efficient configuration of analog and digital circuits is determined based on efficiencies in communicating more data over the same period of time in the intended spectrum. For example, digital circuits adapted for the intended spectrum might enable efficiencies in the processing of at least one of the magnitude, phase, and frequency for the wirelessly signal.

Flowing to block 206, the process determines an energy efficient configuration of digital circuits for intelligent processing of the data included with the wireless signal. This intelligent processing may include, but is not limited to, compression, decompression, and encryption.

At block 208, the process combines, where possible, common determined analog and digital circuits for implementing energy efficiencies for the various factors discussed above and below, and the like.

Stepping to block 210, the process generates an energy efficient configuration of analog and digital circuits that enable wireless connectivity for the intended IC based at least in part on the number of digital and analog elements that are available for implementing wireless communication in the IC. Next, the process returns to processing other actions.

Figure 3:
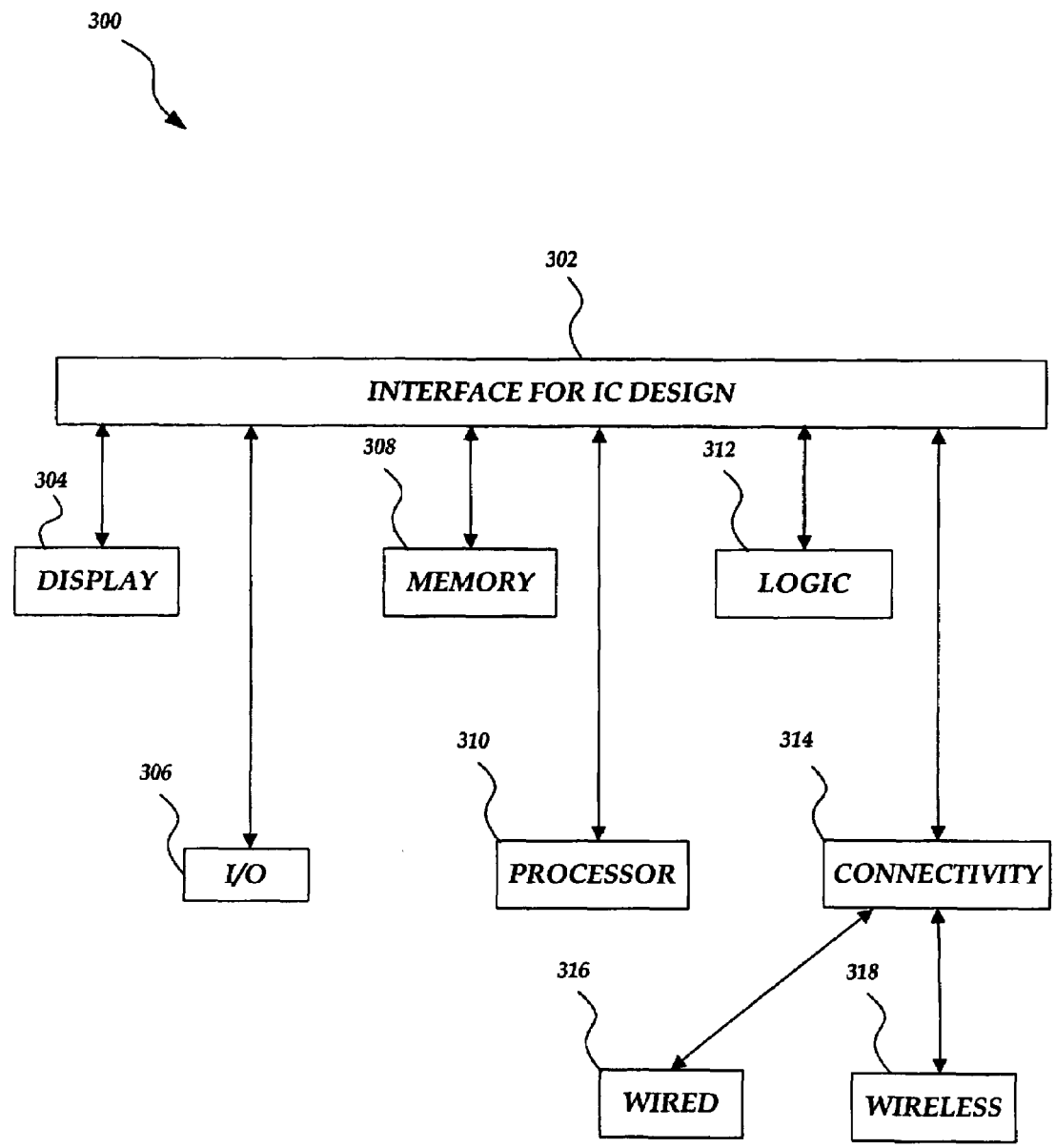
FIG. 3 illustrates an overview of an application for configuring various functions in an integrated circuit.
Figure 4:
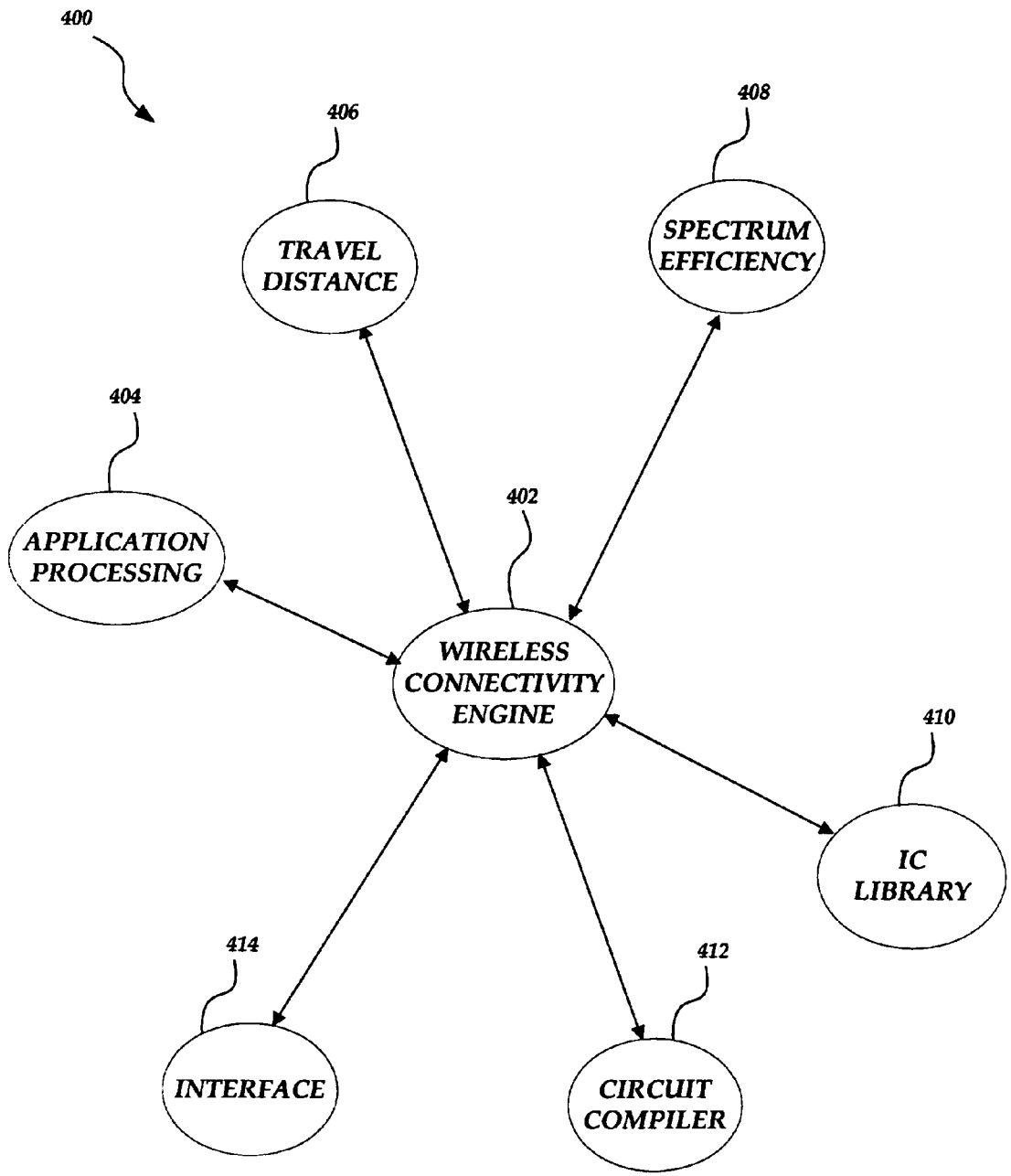
FIG. 4 shows an overview of an application that considers various factors to generate energy efficient digital and analog circuits that enable wireless connectivity in an integrated circuit.

The invention may be employed as a standalone application such as discussed in FIG. 4, or as shown in FIG. 3 as one of several modules that can be selected to prototype the integration of several different types of functions for an IC.

FIG. 3 illustrates an overview 300 of an exemplar system adapted for enabling a user to rapidly design a prototype of an integrated circuit such as an SoC, and the like. Interface 302 is in communication with several modules that enable the prototyping of circuits for various types of functionality in the IC. A user can employ the various modules to select prototype cores/circuits that enable a desired functionality in the IC. These prototype cores/circuits may be provided by a library, database, and the like.

Display module 304 enables the arrangement of circuits in the IC to various types of displays. These displays include, but are not limited to, Cathode Ray Tubes (CRTs), Liquid Crystal Display (LCD) panels, and Light Emitting Diodes (LEDs). I/O module 306 enables a user to configure the IC to support various types of input and output devices. These devices include, but are not limited to, keyboard, mouse, keypad, Firewire ports, USB ports, disk storage interface, printer interface, and the like.

Memory module 308 enables the arrangement of circuits in the IC to operate as memory, including, but not limited to, RAM, ROM, RDRAM, SDRAM, and the like.

Processor module 310 enables the arrangement of circuits in the IC to operate as a processor, including, but not limited to, digital signal processor, microprocessor, and the like.

Logic module 312 enables the arrangement of circuits in the IC to operate as firmware where "hard wired" logical instructions are stored. In some cases, implementing certain types of logical instructions in hardware provides improved energy efficiency and/or speed.

Connectivity module 314 enables the arrangement of circuits in the IC to operate as a communication device with other devices over a network based at least in part on the intended use of the IC. Connectivity module 314 is configured to operate with wireless module 318 and wired module 316, where the wired module enables the arrangement of circuits to communicate over a wired network such as Ethernet, and the like. Wireless module 318 enables the arrangement of circuits to communicate over a wireless network such as Bluetooth, 802.11a/b/g, mobile telephony, and the like.

FIG. 4 illustrates an overview 400 of an exemplary application adapted for enabling a user to rapidly design wireless communication for an IC based on the intended use of the IC. Wireless connectivity engine 402 is in communication with several modules that enable a wireless connectivity solution, including, but not limited to, interface module 414, circuit compiler module 412, library module 410, spectrum efficiency module 408, travel distance module 406, and application processing module 404. Briefly, interface module 414 enables a user to interact with wireless connectivity engine 402. Spectrum efficiency module 408 enables the selection of circuits that digitally implement methods that enable efficient use of a spectrum, where the spectrum is selected based at least in part on the intended use of a particular application.

IC library module 410 enables the selection of an integrated circuit that is available for selecting circuits that digitally implement methods for wireless connectivity, where the spectrum is selected based at least in part on the intended use of a particular application.

Circuit compiler module 412 enables the compiling of selected analog and digital circuits for the selected integrated circuit. The compiled result can be employed to manufacture an integrated circuit with wireless connectivity that is based at least in part on the intended use.

Travel distance module 408 enables the selection of digital circuits that implement methods that enable efficient use of those analog circuits that are employed to wireless communicate over the intended spectrum, where the spectrum is selected at least in part on the intended use and particular application.

Application processing module 404 enables the selection of circuits that digitally implement methods that enable efficient processing of wireless signals. The application processing can include, but is not limited to, encryption, compression, and decompression.

Figure 5:
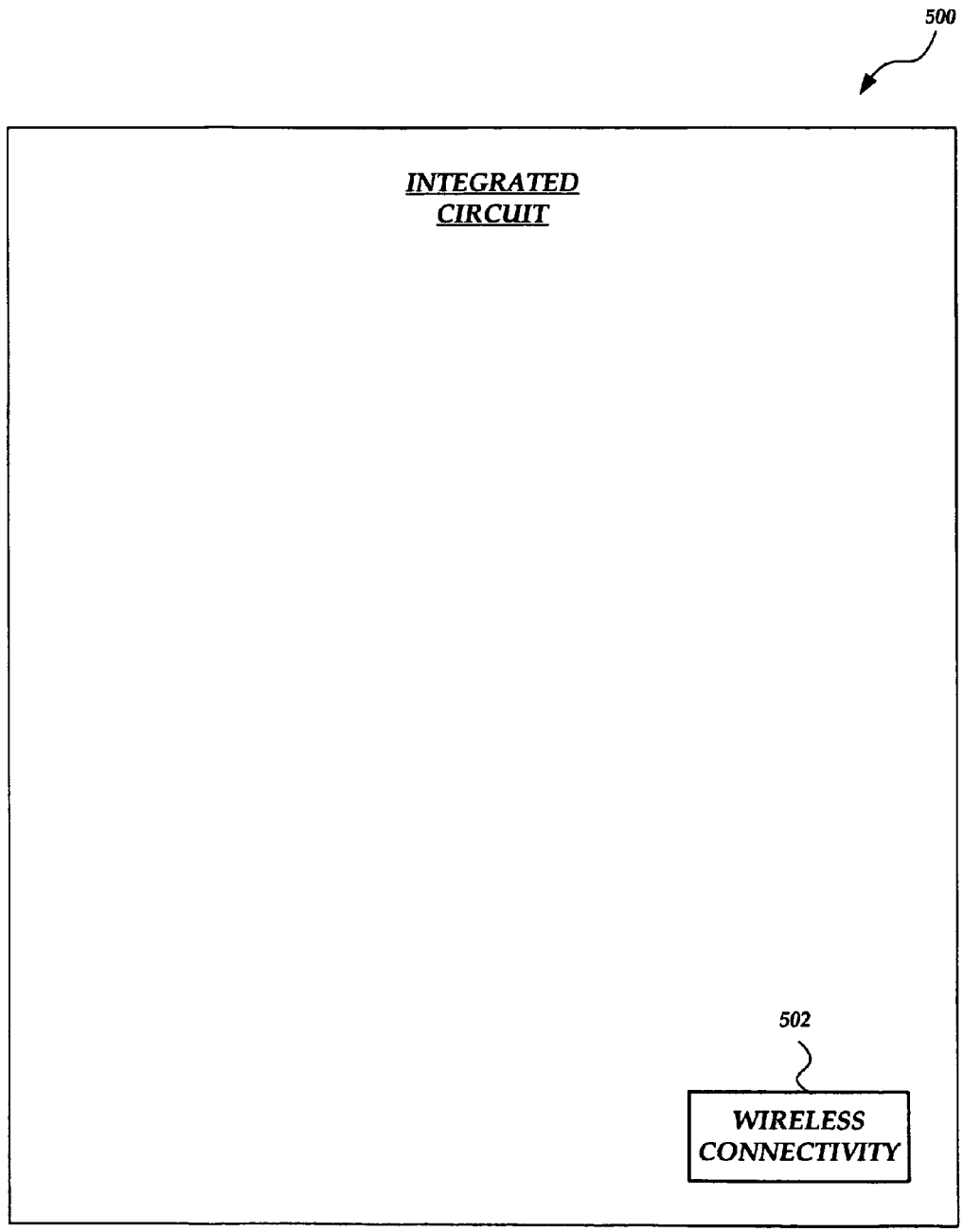
FIG. 5 illustrates an overview of an integrated circuit that provides a portion of its transistors to enable wireless connectivity.

FIG. 5 illustrates an exemplary integrated circuit 500 which includes portion 502, which includes transistors that are set aside for implementing wireless connectivity. Portion 502 includes relatively large transistors for communicating a wireless signal based at least in part on the intended usage. These relatively large transistors consume a substantially larger amount of power than relatively smaller transistors adapted for digital circuits.

Figure 6:
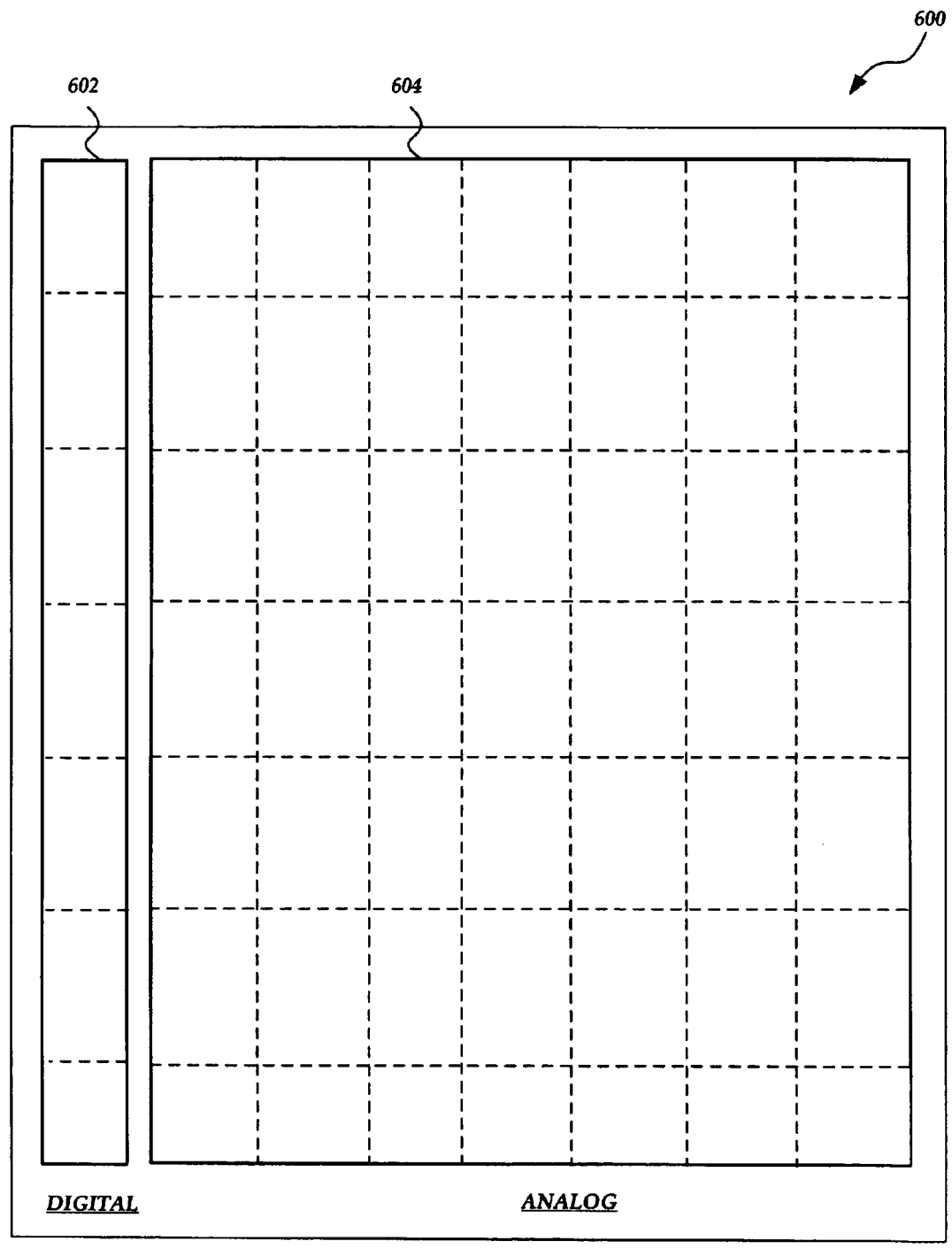
FIG. 6 shows an overview of portion of an integrated circuit that enables the configuration of digital and analog circuits to provide wireless connectivity, in accordance with the invention.

FIG. 6 illustrates an exemplary overview 600 of that portion of an exemplary integrated circuit that is set aside for implementing wireless connectivity as indicated by portion 502 in FIG. 5. Digital section 602 includes transistors that can be arranged for digital circuits, which are relatively smaller than transistors disposed in analog section 604. The relatively larger transistors in analog section 604 can be configured for transmitting and receiving analog signals such as a wireless signal. s.

Although not to scale, the physical size of digital section 602 is shown to occupy a smaller area than analog section 604. However, digital section 602 includes a substantially larger number of transistors than those disposed in the analog section. Also, various portions of digital section 602 and analog section 604 that are not used to implement wireless connectivity can be disabled in a manner that further reduces energy consumption in the integrated circuit based at least in part on the intended use of the wireless connectivity solution.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for providing wireless connectivity for an application, comprising:
    a first component for receiving information regarding an intended use of the application and determining factors related to the intended use of the application;
    a second component for generating digital circuits to enable at least a portion of the factors related to the intended use of the application, wherein the second component generates analog circuits to enable those portions of the factors related to the intended use of the application that are unenabled by the generated digital circuits; and
    a third component for employing the generated digital circuits and generated analog circuits to provide wireless connectivity for the application, wherein a consumption of energy is decreased by an increase in the use of digital circuits to enable factors related to wireless connectivity.

2. The apparatus of claim 1, further comprising another component for compiling the generated digital circuits and generated analog circuits to configure wireless connectivity in an integrated circuit.

3. The apparatus of claim 1, further comprising another component for determining a factor related to an intended distance that the application is employed over, wherein the digital circuits and analog circuits are generated to provide energy efficient wireless connectivity over the distance.

4. The apparatus of claim 1, wherein at least a portion of the generated analog circuits and the generated digital circuits provide wireless connectivity in an energy efficient manner over at least a distance related to the intended use of the application.

5. The apparatus of claim 1, further comprising a component for determining a factor related to a spectrum that the application will employ for wireless connectivity, wherein the digital circuits and analog circuits are generated to enable energy efficient wireless communication over that spectrum.

6. The apparatus of claim 1, wherein at least a portion of the generated digital circuits and generated analog circuits enable data to be wirelessly communicated over a spectrum in an energy efficient manner for the intended use of the application.

7. The apparatus of claim 1, further comprising another component for determining a processing factor related to the intended use of the application, wherein the digital circuits and analog circuits are generated in accordance with the energy efficient processing of data associated with wireless connectivity for the application.

8. The apparatus of claim 1, wherein at least a portion of the generated digital circuits and analog circuits enable energy efficient processing of data associated with wireless connectivity for the application.

9. The apparatus of claim 1, wherein at least a portion of the generated analog circuits and generated digital circuits enable energy efficient processing of methods, including, at least one of compression, decompression, and encryption.

10. The apparatus of claim 1, further comprising another component for determining an integrated circuit that enables the energy efficient implementation of the generated analog circuits and generated digital circuits, wherein the determined integrated circuit is associated with a library of integrated circuits.

11. The apparatus of claim 1, wherein the application is at least one of Bluetooth, IEEE 802.11a, IEEE 802.11b, IEEE 802.11g, GSM, TDMA, CDMA, WCDMA, and CDMA 2000.

12. The apparatus of claim 1, wherein at least one of the digital circuits and the analog circuits are generated based on an amount of transistors available for such generation.

13. The apparatus of claim 1, wherein employing the generated digital and analog circuits to implement wireless connectivity enables relatively energy efficient processing of at least one of magnitude, phase, and frequency for a wireless signal.

14. The apparatus of claim 1, further comprising another component for determining a factor related to an actual distance that the application is employed over, wherein the digital circuits and analog circuits are generated to provide energy efficient wireless connectivity over the actual distance.

15. The apparatus of claim 1, wherein at least a portion of the generated digital and analog circuits are combined to provide energy efficient processing of a wireless signal.

16. The apparatus of claim 1, wherein at least a portion of the generated digital and analog circuits are disabled to provide energy efficient processing of a wireless signal.

17. A method for providing wireless connectivity for an application, comprising actions of:
- determining factors related to a use of the application based on received information;
- generating digital circuits to enable at least a portion of the factors related to the intended use of the application,
- generating analog circuits to enable those portions of the factors related to the use of the application that are unenabled by the generated digital circuits; and
- employing the generated digital circuits and generated analog circuits to provide wireless connectivity for the application, wherein a consumption of energy is decreased by an increase in the use of digital circuits to enable factors related to wireless connectivity.

18. The method of claim 17, wherein at least one of the digital circuits and the analog circuits are generated based on an amount of transistors available for such generation.

19. The method of claim 17, further comprising enabling relatively energy efficient processing of at least one of magnitude, phase, and frequency for a wireless signal.

20. The method of claim 17, further comprising determining a factor related to an actual distance that the application is employed over, wherein the digital circuits and analog circuits are generated to provide energy efficient wireless connectivity over the actual distance.

21. The method of claim 17, further comprising at least a portion of the generated digital and analog circuits to implement energy efficient processing of a wireless signal.

22. The method of claim 17, further comprising disabling at least a portion of the generated digital and analog circuits to provide energy efficient processing of a wireless signal.

23. A processor readable storage media that includes instructions for performing actions to provide wireless connectivity for an application, comprising:
- a first component for determining factors related to an intended use of the application based on received information;
- a second component for generating digital circuits to enable at least a portion of the factors related to the intended use of the application,
- a third component for generating analog circuits to enable those portions of the factors related to the use of the application that are unenabled by the generated digital circuits; and
- a fourth component for employing the generated digital circuits and generated analog circuits to provide wireless connectivity for the application, wherein a consumption of energy is decreased by an increase in the use of digital circuits to enable factors related to wireless connectivity.

* * * * *